United States Patent [19]

Thornton et al.

[11] Patent Number: 5,531,129

[45] Date of Patent: Jul. 2, 1996

[54] APPARATUS FOR EXTRACTING WEAR PARTICLES FROM USED OIL FILTERS

[75] Inventors: Janine M. Thornton; Michael G. Thornton, both of Littleton, Colo.

[73] Assignee: Synectic Technology, Inc., Littleton, Colo.

[21] Appl. No.: 523,766

[22] Filed: Sep. 5, 1995

Related U.S. Application Data

[63] Continuation-in-part of Ser. No. 309,910, Sep. 21, 1994, abandoned.

[51] Int. Cl.⁶ .................................................. B01D 21/30
[52] U.S. Cl. ...................... 73/863.24; 73/116; 73/863.83
[58] Field of Search ................................ 73/116, 863.23, 73/863.24, 863.81, 863.83, 863.85, 53.05, 53.07, 61.42, 64.56, 803.24; 210/409; 134/22.18, 113, 133, 135, 140, 144, 167 R, 168 R, 169 A

[56] References Cited

U.S. PATENT DOCUMENTS 3,073,325 1/1963 Rebizzo et al. .
3,526,127 9/1970 Sarkis .
3,688,782 9/1972 Smith .
4,140,543 2/1979 Soleri et al. .
4,299,245 11/1981 Clapper .
5,051,173 9/1991 Hoelzl .
5,143,529 9/1992 Means, Jr. .

*Primary Examiner*—Robert Raevis
*Attorney, Agent, or Firm*—Dorr, Carson, Sloan & Birney

[57] ABSTRACT

An apparatus extracts standardized samples of wear particles from a series of used oil filters by rotating each oil filter while spraying a solvent fluid into the opening at the base of the oil filter. The apparatus includes a housing to hold the filter having a movable cover and a base that contacts the filter base and allows rotation of said filter. A crawler assembly within the housing cover initially translates along the axis of rotation toward the housing base until the filter is held between the crawler and the housing base. A motor associated with the crawler assembly (or the housing base) then rotates the filter. A shaft extending through the housing base into the filter opening carries a nozzle that directs a spray of fluid into the filter during rotation to rinse wear particles from the filter for subsequent analysis. A predetermined quantity of fluid is sprayed into each filter to produce a standardized sample. The interior of the housing also sprayed with fluid between consecutive filters to prevent cross-contamination.

17 Claims, 5 Drawing Sheets

APPARATUS FOR EXTRACTING WEAR PARTICLES FROM USED OIL FILTERS

RELATED APPLICATION

The present application is a continuation-in-part of the Applicants' U.S. patent application Ser. No. 08/309,910, filed on Sep. 21, 1994, now abandoned.

BACKGROUND OF THE INVENTION

1. Field of the Invention

The present invention relates generally to the field of analyzing wear particles in used lubricants. More specifically, the present invention discloses an apparatus for extracting wear particles from a series of used oil filters to create a uniform series of samples for subsequent testing and analysis.

2. Statement of the Problem

A number of systems have been used in the past to monitor engine condition by qualitative or quantitative analysis of wear particles. These systems typically begin by sampling the engine oil. For example, U.S. Pat. No. 3,526,127 to Sarkis discloses a computerized system for automated analysis of a large number of oil samples. Each sample container 1 is first agitated by a shaking station 2. The sample is then passed to a sample recording station 3 wherein sample data (e.g., oil type, engine type, and customer) are entered. The viscosity, infrared characteristics, and metal contents of each sample are measured and analyzed by a computer.

In contrast to the prior art systems, the present invention is designed to extract wear particles trapped within used oil filters. These particles can then be separated according to their size range or magnetic properties and subsequently analyzed qualitatively or quantitatively using a conventional energy dispersive x-ray fluorescence (EDXRF) system. More specifically, the present invention is designed to meet the particular needs of the Joint Oil Analysis Program (JOAP) laboratories. These laboratories belong to the Army, Navy, Air Force, and other Department of Defense (DoD) agencies. All of these laboratories are part of an interagency cooperative effort to implement an effective condition monitoring response to threats, and to increase safety of service personnel and the longevity of the hardware transporting the personnel. It is the responsibility of the JOAP Technical Support Center (TSC) to set the equipment standards for analysis for each of the individual condition monitoring and oil analysis programs operated by the Army, Navy, Air Force, and other DoD agencies.

Several types of jet engines including those used on the F-18 fighter and the Blackhawk, Apache, and Nighthawk helicopters are now using specially designed oil filters rated to pass only particles smaller than 15 microns in size. However, after only a few hours of operation, carbon in the oil creates a fine filter coating on the surface of the oil filter that effectively prevents passage of all particles larger than 0.3 micron. Since all particles larger than 0.3 micron are trapped in the oil filter of the aircraft equipped with the fine filtration, there are no wear metal particles available for analysis in a conventional sample of engine oil. Therefore, conventional monitoring systems based on engine oil samples will provide little meaningful information due to the scarcity of wear particles suspended in the oil samples and may completely fail to recognize dangerous engine conditions.

In addition, there is a growing recognition in the engine condition monitoring field that the larger metal particles (10 microns and up) are far more indicative of abnormal wear and are the best indicators of impending, possibly catastrophic failure. This seems reasonable because small metal particles present in the oil are the result of both normal wear and large particles being ground into small particles by the mechanism. Therefore, any analytical technique that is capable of analyzing only for small particles will be less effective in predicting a need for engine maintenance, and will only occasionally be able to predict the impending catastrophic failures that are most hazardous.

Experimental studies have also been performed in the past using wear particles that have been extracted from used oil filters by manual flushing or rinsing. However, these experimental studies have been subject to sample variation due to differences in the amount of solvent fluid, solvent residence time, and the specific manner in which each oil filter is manually rinsed. The laboratory technician must extensively handle each oil filter and is also exposed to the waste oil and the liquid solvent. In contrast, the present system provides a means to standardize such ad hoc laboratory procedures so that a large number of used oil filters can be tested with a high degree of uniformity. The present system also minimizes the operator's handling of the oil filter and exposure to waste oil and solvent.

Although the present invention was specifically developed to support aircraft engines used for helicopters and jet fighters, it should be expressly understood that the invention is also applicable to analysis of oil filters from commercial aircraft, ground-based equipment such as heavy construction equipment, trucks, power generation stations, ocean liners, other types of ships, and high-performance automobiles. In short, the present system is readily adaptable to all types of machinery equipped with an oil filter designed to trap any form of particulates.

3. Solution to the Problem

None of the prior art references show a system for extracting particles trapped in used oil filters, including over-sized particles and particles trapped by the fine-filtration oil filters currently used in military aircraft. In particular, the present invention provides an automated system for extracting wear particles by rotating the oil filter at high speed while spraying a solvent fluid into the opening at the base of the oil filter.

SUMMARY OF THE INVENTION

This invention provides an apparatus for extracting standardized samples of wear particles from a series of used oil filters. Each filter is rotated while spraying a solvent fluid into the opening at the base of the filter. The apparatus includes a housing to hold the filter having a movable cover and a base that contacts the filter base and allows rotation of the filter. A crawler assembly within the housing cover initially translates along the axis of rotation toward the housing base until the filter is held between the crawler and the housing base. A motor associated with the crawler assembly (or the housing base) then rotates the filter. A shaft extending through the housing base into the filter opening carries a nozzle that directs a spray of fluid into the filter during rotation to rinse wear particles from the oil filter for subsequent analysis. A predetermined quantity of fluid is sprayed into each filter to produce a standardized sample. The interior of the housing also sprayed with fluid between consecutive filters to prevent cross-contamination.

The advantages of the present invention are that it automates nearly all of the conventional manual particle extraction process steps, thereby improving reproducibility of the results and throughput efficiency. The operator is no longer directly exposed to the liquid solvent or waste oil associated with manual extraction of the particles from the used oil filter. The quantity of solvent required for particle extraction is minimized and can be made uniform for each oil filter. Reproducibility of results is no longer dependent on the skill, consistency, and patience of individual technicians.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

System Overview

Figure 1:
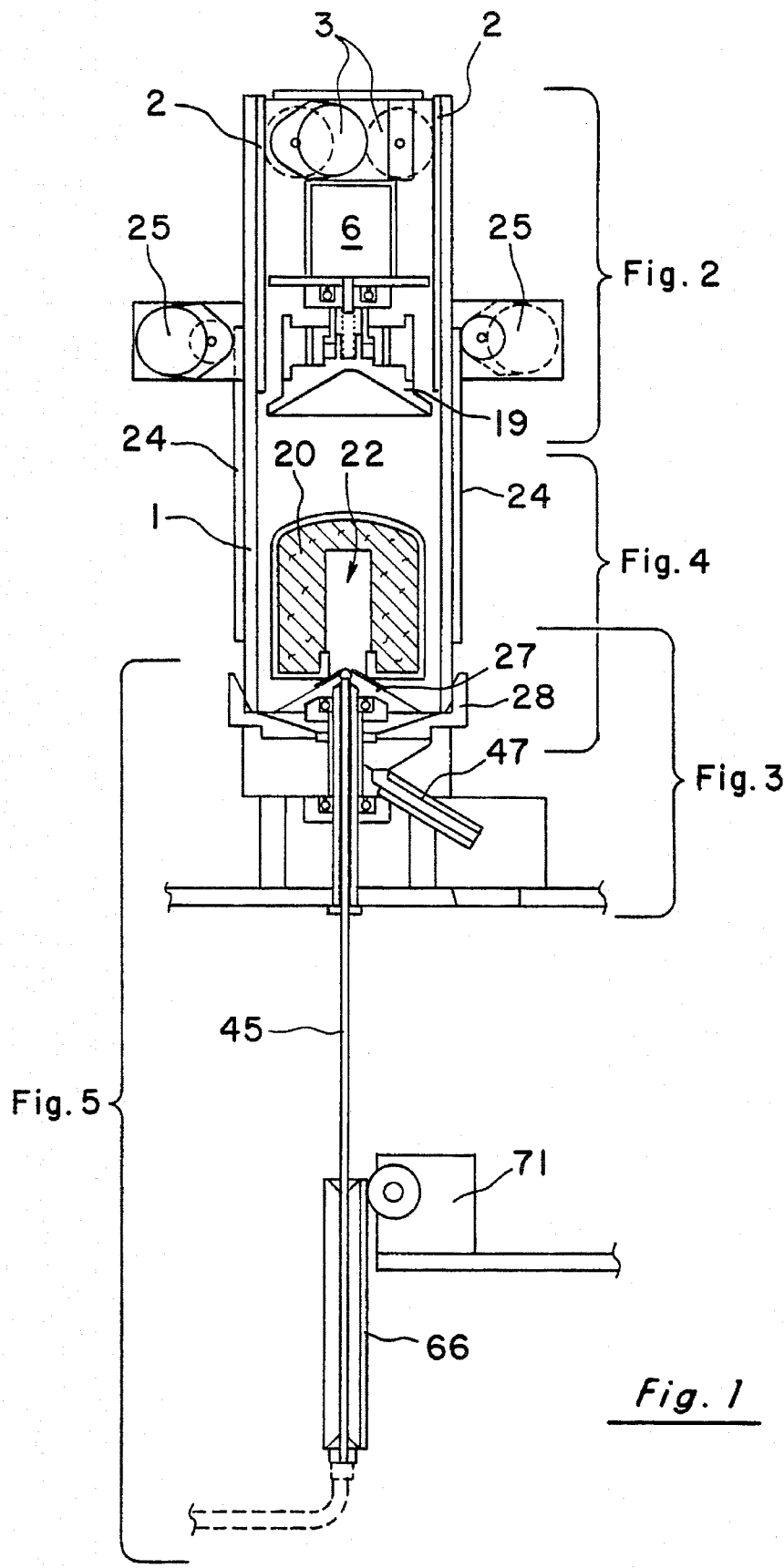
FIG. 1 is a side cross-sectional view of the entire system.
Figure 3:
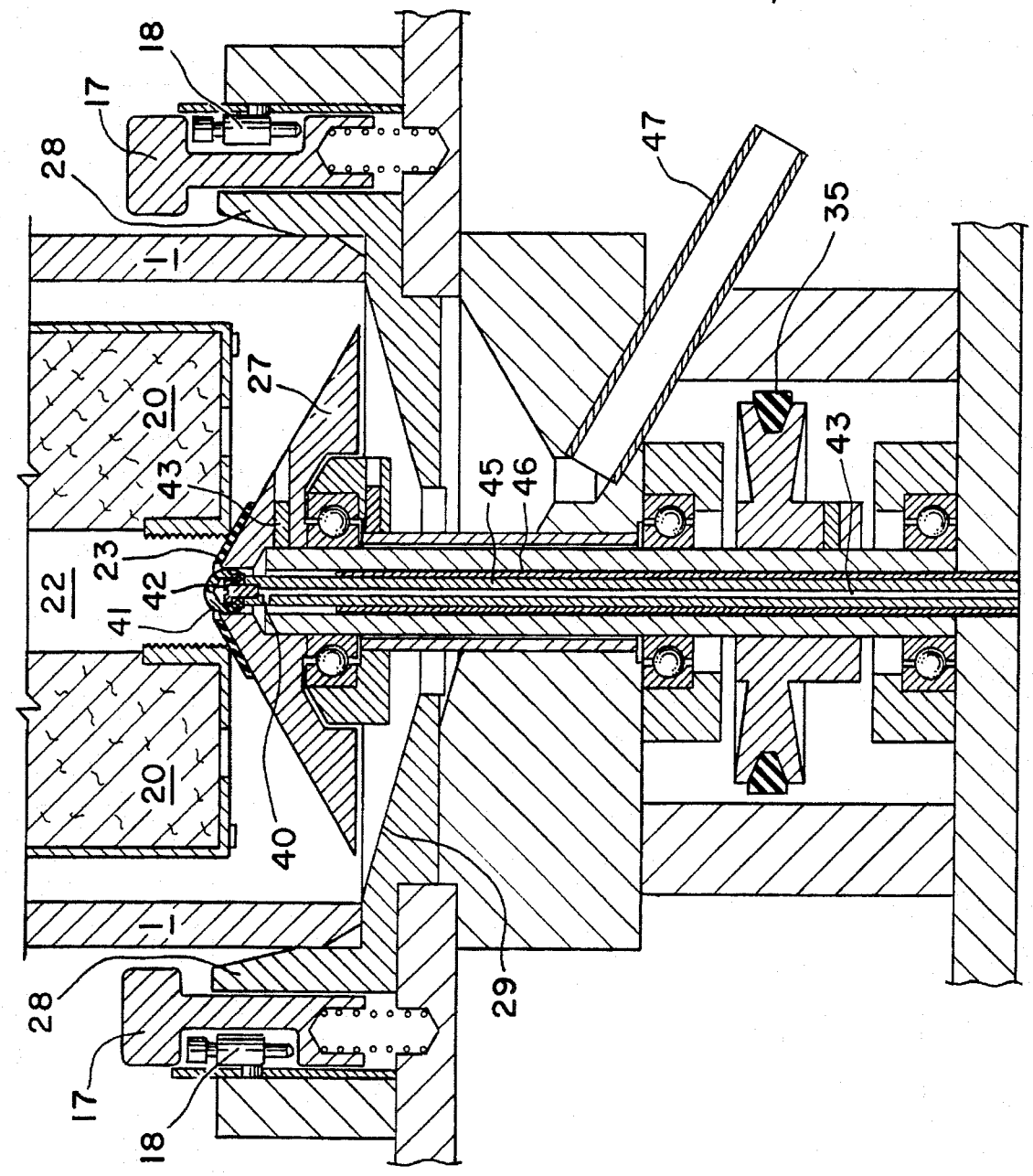
FIG. 3 is a fragmentary side cross-sectional view corresponding to FIG. 2 of the lower portion of the housing, lower filter support, drain tube, and the upper portion of the fluid rinse shaft.
Figure 4:
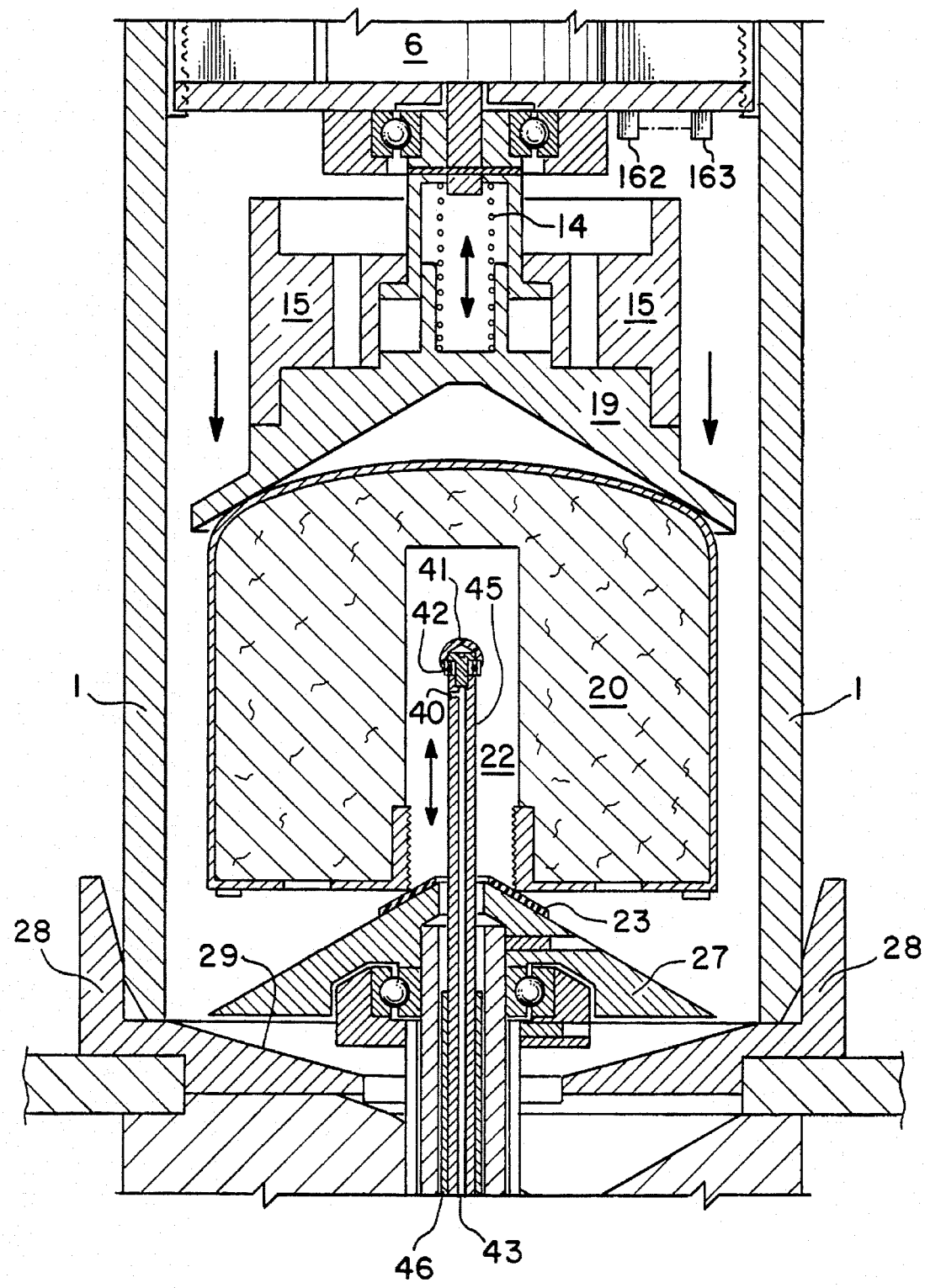
FIG. 4 is a fragmentary side cross-sectional view of the housing with the crawler assembly lowered to engage the oil filter.

Turning to FIG. 1, a side cross-sectional view of the entire system is provided. In general terms, the system includes a movable housing I and a housing base assembly 28 that combine to define an interior chamber to receive the oil filter 20. As shown in FIGS. 3 and 4, the housing base assembly 28 includes a collection funnel 29 that collects solvent fluid and suspended wear particles at the bottom of the chamber and directs this flow out of the chamber through a drain tube 47 extending through the housing base assembly. The housing base assembly 28 also includes a lower oil filter support 27 having a generally conical cross-section, as depicted in FIGS. 1, 3 and 4. This lower support 27 contacts the opening 22 in the base of the oil filter 20 and allows rotation of the oil filter about the vertical axis. The movable housing 1 can be raised and lowered relative to the housing base 28 by means of a number of drive motors 25 having pinion gears that engage corresponding racks 24 attached to the exterior of the housing 1 as shown in FIG. 1. To ensure operator safety, a safety switch 18 (shown in FIG. 3) is deflected by a guard ring 17 if the lower edge of the housing 1 contacts any obstruction before coming into contact with the housing base 28. Activation of the safety switch 18 by deflection of the guard ring 17 causes the drive motors 25 to reverse to the full open position.

Figure 2:
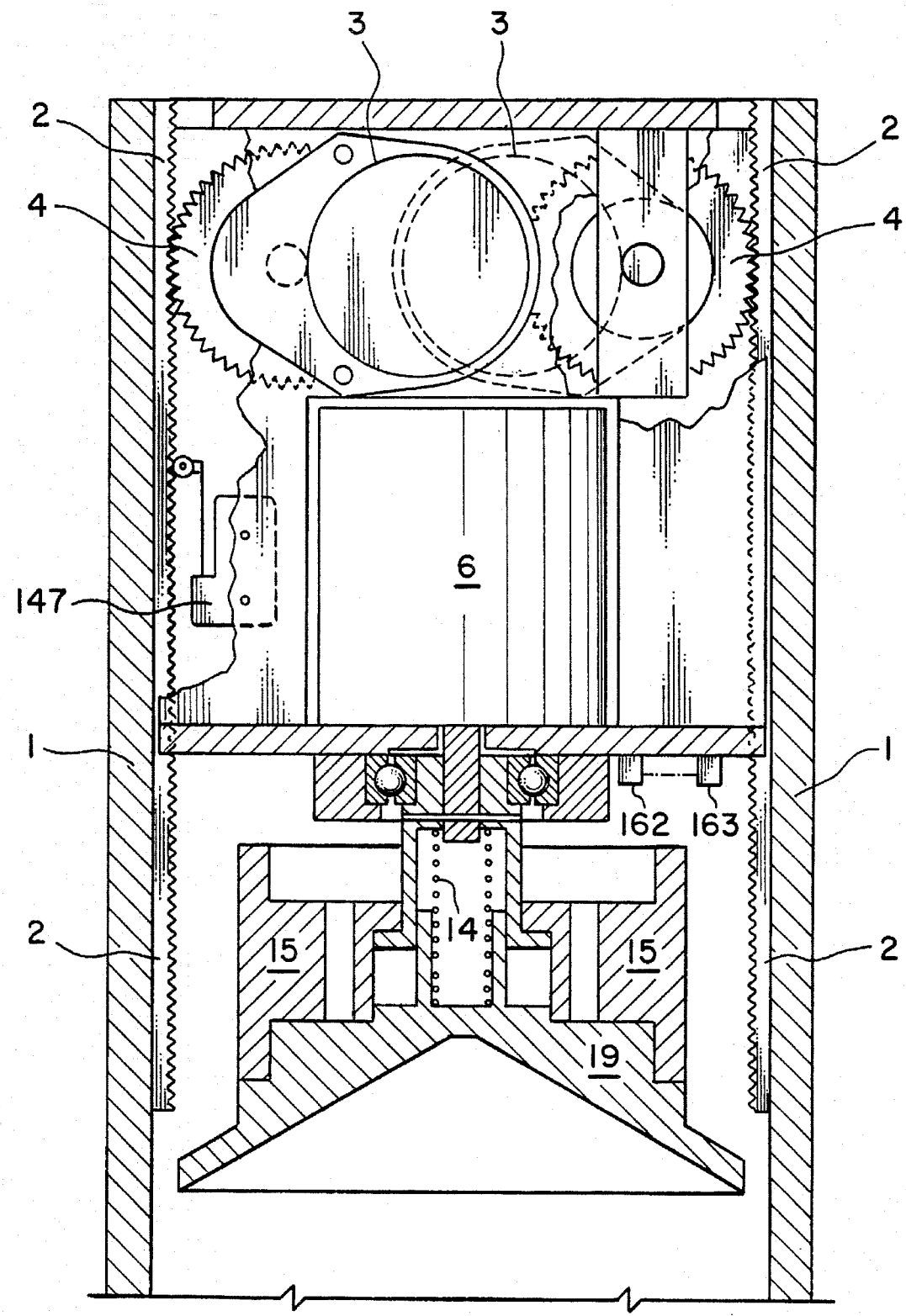
FIG. 2 is a fragmentary side cross-sectional view of the upper portion of the housing, crawler assembly, and upper filter support.

After the housing has been closed, a crawler assembly within the housing cover 1 translates downward along the vertical axis toward the housing base 28 until the crawler assembly contacts the upper end of the oil filter 20 to hold the oil filter 20 between the crawler and the housing base. As shown in FIG. 2, the vertical position of the crawler assembly is controlled by a number of crawler motors 3 having pinion gears 4 that engage corresponding racks 2 attached to the interior of the movable housing 1. The crawler assembly includes an upper oil filter support 19 having a concave conical surface that contacts the upper end of the oil filter and is spring-loaded relative to the remainder of the crawler assembly. Upon contact with the oil filter, the spring 14 begins to compress and allows the upper oil filter support 19 to move upward relative to the remainder of the crawler assembly. This relative motion is sensed by means of a photodetector 163 and is used to halt further downward motion of the crawler assembly by the crawler motors 3. A spin motor 6 associated with the crawler assembly then rotates the upper support 19 and the oil filter 20 about the vertical axis within the housing 1. Alternatively, the spin motor can be associated with the housing base to drive the lower oil filter support 27.

The maximum range of motion of the crawler assembly along the rack 2 is limited by upper and lower limit switches that detect the upper and lower ends, respectively, of the rack. For example, the lower limit switch 147 is shown in FIG. 2. When the crawler assembly has moved downward to the point where the lower limit switch 147 is no longer compressed by the rack 2, the control system reverses the crawler motors to raise the crawler assembly to its up position. Similarly, the top limit switch is mounted on the crawler assembly and senses the upper edge of the rack. The top limit switch triggers the control system to prevent further upward movement of the crawler assembly after the upper end of the rack 2 has been reached.

The lower oil filter support 27 and the upper oil filter support 19 provide two conical surfaces that securely hold any substantially cylindrical oil filter 20. Due to the smooth conical shape of these surfaces, the oil filter 20 is automatically forced to assume a vertical position and is automatically centered about the vertical axis within the housing 1 as the spring 14 is compressed by the upper support 19. It should be noted that the present invention may be used with any substantially cylindrical cartridge or screw-on canister type oil filter 20 having an opening 22 extending axially from its base. Oil filters may have flanges, rims, or other cylindrically symmetrical features along the axis of the cylinder or on either or both ends. The oil filters may also be open on one end or on both ends.

A rinse shaft 45 extends vertically upward through the housing base 28 and the lower support 27. The rinse shaft 45 can be translated upward along the vertical axis to deliver a spray of solvent fluid into the oil filter opening 22. In the preferred embodiment, pressurized fluid is supplied through a central passage 43 to a nozzle 40 at the upper end of the shaft 45. The rinse shaft 45 can also be connected to a source of pressurized air to purge fluid from the rinse shaft and to assist in extracting wear particles from the oil filter. The elevation of the rinse shaft 45 is controlled by the slip sleeve motor 71 shown in FIGS. 1 and 5.

Figure 5:
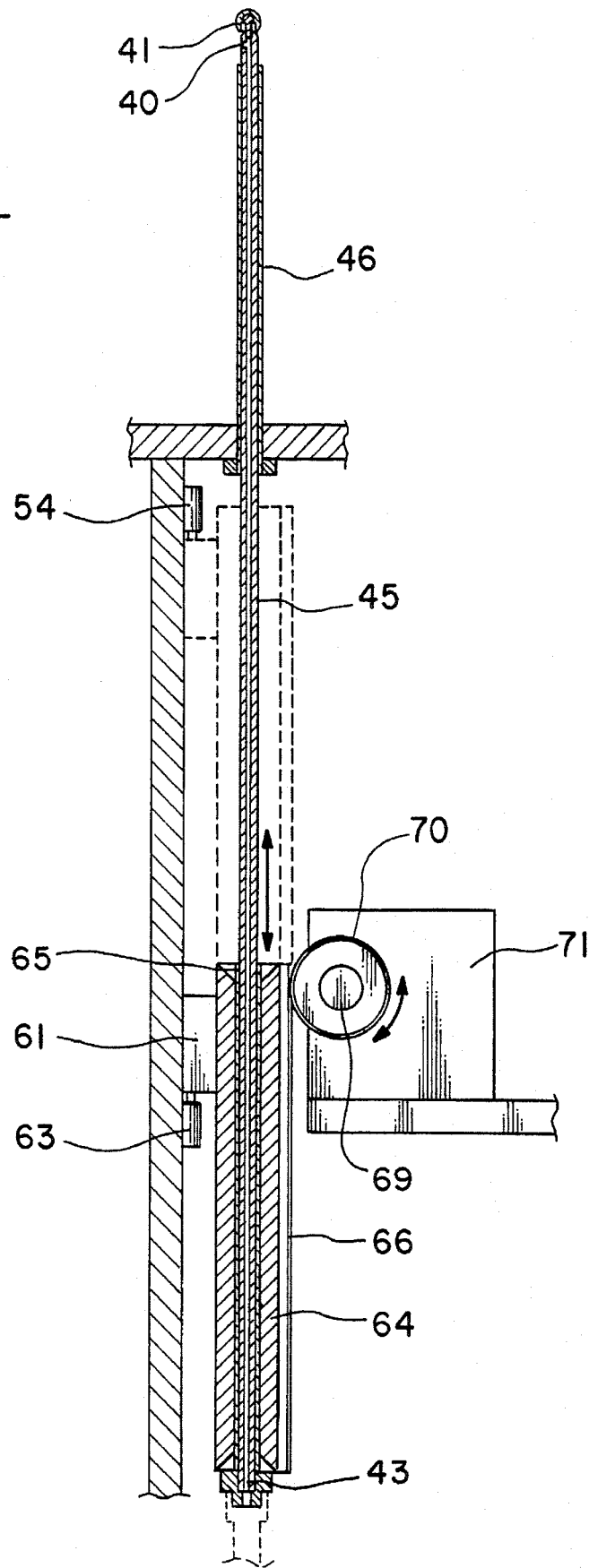
FIG. 5 is a side cross-sectional view of fluid rinse shaft, slip sleeve, motor, and related components used to flush the inside of the oil filter.

The system includes means to automatically limit the range of motion of the rinse shaft 45 depending on the axial length of the oil filter opening. In the preferred embodiment, a small nylon sphere 41 is rotatably mounted to the top of the rinse shaft 45 on a bearing 42. As the rinse shaft is extended upward, the nylon sphere 41 eventually contacts the top interior surface of the oil filter opening 22. At this point, the nylon sphere 41 begins rotating at a speed identical to the rotational speed of the oil filter 20. At the same time, the slip sleeve 64 slips upward relative to the position of the now stationary rinse shaft 45, as shown in FIG. 5. When the slip sleeve 64 reaches the maximum height and actuates the upper limit switch 54, the adjustable torque setting of the clutch 69 is exceeded, thereby causing the clutch 69 to slip. This slip sleeve mechanism prevents damage to the slip sleeve drive motor 71 and drive gear 70. When the oil filter 20 has an opening on both ends, damage to the fluid rinse shaft 45 is similarly prevented when the nylon sphere 41 contacts the upper oil filter support 19 and begins to rotate at the same speed as the upper oil filter support 19.

A compliant friction wrap 65 material that is both highly compressible and very resilient is employed to provide sufficient friction to allow the slip sleeve 64 to raise or lower the fluid rinse shaft 45 until the maximum upper or lower position is reached or an obstruction is encountered. The compliant friction wrap 65 allows the slip sleeve 64 to move the fluid rinse shaft 45 until an obstruction is encountered and then allows the slip sleeve 64 to slip on the stationary rinse shaft 45 until the upper limit switch 54 or the lower limit switch 63 is actuated by contact with the limit switch actuator block 61 mounted to the slip sleeve 64 directly opposite the rack 66.

System Operation

Installation of Oil Filter

The operator begins by opening the housing and inserting the oil filter 20 into the housing chamber. The base of the oil filter 20 should be generally aligned with the apex of the conical lower oil filter support 27. However, precise alignment of the center of the oil filter 20 with the apex of the lower oil filter support 27 is not required. If the oil filter 20 is closed on either end, the closed end of oil filter should be oriented at the top when placed on the lower oil filter support 27. When the sample preparation system is used with a screw-on canister oil filter, a rubber adapter 23 is manually positioned on the apex of the lower oil filter support 27 to provide a seal between the oil filter 20 and the lower oil filter support 27.

If the operator has not installed the oil filter 20 within the time period programmed into the control system, the housing I is lowered by the drive motors 25 until it is once again in contact with housing base 28 to prevent contamination of the chamber by airborne dust, sand, or other hazards from the ambient environment. If this occurs, an indicator light will remain illuminated. Since the housing 1 is now in the closed position, the operator must press a start switch to open the chamber.

Next, the operator presses a start switch to lower the movable housing 1 and close the chamber. The housing 1 is lowered by activation of the drive motors 25 until contact with the housing base 28 is made. The oil filter 20 is then secured and aligned within the housing 1 by activating the crawler motors 3. The motion of the crawler assembly stops when the top edge of the mount 15 for the upper support 19 is pushed toward the spin rinse motor 6 and interrupts the beam path between an LED 162 and photodetector 163 mounted on the crawler assembly. When the mount 15 stops, the spring 14 is fully compressed and ensures that the oil filter 20 will not slip out of the upper oil filter support 19.

The crawler assembly is also used to check that an oil filter has been installed in the housing and that the height of the oil filter falls within predetermined maximum and minimum limits. If the lower limit switch 147 associated with the crawler assembly detects the lower end of the rack 2 and the light path between the LED 162 and photodetector 163 has not been interrupted, either the oil filter 20 is shorter than the minimum acceptable height or the operator did not actually insert an oil filter 20. In this event, the control system will activate the crawler drive motors 3 to raise the crawler assembly to the full-up position and the drive motors 25 will be activated to raise the housing 1 until it is in the full-up position. If the oil filter 20 has been installed and the light path between the LED 162 and photodetector 163 is interrupted before the housing 1 makes contact with the housing base 28, the oil filter 20 is greater than the maximum acceptable height and the housing 1 is again driven to the full-up position by the drive motors 25.

Wear Particle Extraction

Before the oil filter 20 is rotated at high speed and rinsed with solvent fluid to extract wear particles, the spin motor 6 is pulsed several times to achieve a low-speed rotation of the oil filter 20. This causes any excess oil and oversize particles to be ejected at a velocity low enough to avoid damage to the internal surfaces of the housing 1. After a period of time, the rotational velocity of the oil filter 20 is increased until a predetermined maximum rotational speed is reached. The oil filter 20 can be driven solely by the spin motor 6 associated with the crawler assembly. However, if additional torque is required, a second spin motor (not shown) can be employed to drive a sheave 35 attached to the lower portion of the housing associated with the lower oil filter support 27, as shown in FIG. 3.

After the oil filter 20 has reached the maximum rotation speed, the slip sleeve motor 71 is activated to raise the fluid rinse shaft 45 to the maximum height possible within the axial opening of the oil filter 20 or until either the upper limit switch 54 is activated by contact with limit switch actuator block 61, or the maximum activation time of the slip sleeve motor 71 is reached. Either condition shuts off power to the slip sleeve motor 71. If the fluid rinse shaft 45 contacts either the upper interior of a closed end oil filter 20 or the upper oil filter support 19 before the maximum activation time is reached by the control circuit, no damage to the fluid rinse shaft 45 will occur due to slip sleeve mechanism previously discussed.

After the upper limit of travel is reached by the fluid rinse shaft 45, pressurized solvent fluid is delivered to the nozzle 40 through the central passage 43 of the rinse shaft 45. The fluid sprays radially outward from the nozzle 40 of the fluid rinse shaft 45 into the oil filter opening 22 to rinse wear particles from the oil filter 20. Solvent fluid and particles extracted from oil filter 20 exit the housing 1 through the collection funnel 29 and the drain tube 47. Fluid continues to flow for a time period programmed into the control system. At the end of this time period, the flow of solvent is turned off and pressurized air is delivered through the central passage 43 and nozzle 40 of the rinse shaft 45 to force fluid and extracted wear particles from the oil filter 20. In the preferred embodiment, this preprogrammed time period for fluid flow results in a substantially fixed quantity of fluid being sprayed through the nozzle 40 for each filter in the series being tested. This helps to produce a standardized sample for each filter in the series.

Experience has shown that it is important to prevent air bubbles from becoming trapped in the lines delivering fluid to the central passage 43 and nozzle 40. Air bubbles in the lines become compressed while pressurized fluid is being delivered to the nozzle 40. The air bubbles then decompress after the flow of fluid has ceased, and cause fluid in the lines to gradually dribble out through the nozzle over a period of time. This phenomenon can jeopardize the uniformity of the samples. It also wastes fluid and is untidy.

High-speed rotation of the oil filter 20 continues for a predetermined time period (e.g., 10 seconds) after the fluid flow ceases and is accompanied by a flow of pressurized air through the fluid rinse shaft 45 to remove any remaining fluid that may be held in the oil filter 20. The rinse shaft 45 is then lowered by activation of the slip sleeve motor 71 and continues until the lower limit switch 63 is actuated. Depending on the vertical height attained when the fluid rinse shaft 45 reaches its upper limit, the base of the fluid rinse shaft 45 will most likely reach the limit of travel before the lower limit switch 63 is actuated. When this occurs, the slip sleeve 64 slips relative to the position of the now stationary fluid rinse shaft 45. The slip sleeve motor 71 will continue to drive the slip sleeve 64 toward the downward position until the lower limit switch 63 is actuated or until the control system reaches the maximum time programmed to ensure that the fluid rinse shaft 45 has been returned to its lowest position. If the slip sleeve 64 reaches the lowest position and the slip sleeve motor 71 is still activated, the clutch 69 for the slip sleeve drive gear 70 prevents damage to the system. If an internal obstruction within the oil filter 20 somehow prevents automated lowering of the fluid rinse shaft 45, the operator can physically push the fluid rinse shaft 45 to the full downward position without damage to the system, although the possibility of an obstruction preventing normal operation is extremely remote.

Removal of the Oil Filter

After the high-speed rotation and solvent flush sequence is completed, the control system activates the drive motors 25 to open the chamber by raising the movable housing 1. The crawler motors 3 also raise the crawler assembly to release the oil filter 20. An indicator is illuminated until the oil filter 20 has been removed. The operator removes the oil filter 20 and presses the "Continue" switch. The control system then activates the drive motors 25 to lower the housing 1 until it is once again in contact with housing base 28. At that point, the control system activates the crawler motors 3. The crawler assembly traverses the entire length of travel to ensure that the oil filter 20 has actually been removed. If the operator has not removed the oil filter 20, the upper oil filter support 19 will make contact with the upper end of the oil filter 20 causing the mount 15 to be pushed to the point where it interrupts the light path between the LED 162 and the photodetector 163 attached to the crawler assembly. This will cause the control system to activate both of the dual drive motors 25 to open the chamber, and the crawler drive motors 3 to release the oil filter 20.

If the operator has not removed the oil filter 20 within the time period programmed into the control system, the housing 1 is lowered by the drive motors 25 until it is once again in contact with housing base 28 to prevent contamination of the system by airborne dust, sand, or other environmental hazards from the ambient environment. If this occurs, an indicator will remain illuminated. Since the housing 1 is now in the closed position, the operator must press the "Continue" switch to open the chamber. This sequence is repeated as many times as necessary until the operator has actually removed the oil filter 20. If the oil filter 20 has been removed and the "Continue" switch is pressed, the crawler assembly should not encounter any obstructions before it reaches the lower limit switch for the crawler assembly. This will signal the control system to keep the housing chamber closed and the crawler assembly will return to the full-up position in preparation for the spin rinse sequence designed to rinse residual wear particles out of the housing.

Spin Rinse

The spin rinse sequence is also used to rinse the housing to avoid cross-contamination between samples. The spin rinse sequence is performed after the oil filter 20 has been removed from the housing 1, the "Continue" switch has been pressed, the housing has been lowered into contact with the housing base 28, and the control system has raised the crawler assembly to the full-up position. A first spin rinse sequence cannot be performed until all of the above criteria have been met. If the conditions have been met, subsequent spin rinse cycles can be performed as required so long as the housing 1 remains in contact with housing base 28.

The spin rinse sequence begins by activating the slip sleeve motor 71 to raise the fluid rinse shaft 45 to the maximum height possible and the upper limit switch 54 is activated by contact with the limit switch actuator block 61. When this condition is reached, the nylon sphere 41 mounted to the top of the fluid rinse shaft 45 will be in contact with the upper oil filter support 19. The spin motor 6 is activated causing the upper oil filter support 19 to rotate. Pressurized fluid flows through the inside passage 43 of fluid rinse shaft 45 and sprays radially outward through the nozzle 40. As fluid continues to flow, the control system activates the crawler drive motors 3. The high-speed rotation of the upper oil filter support 19 causes the solvent to be radially accelerated toward the internal wall of the housing 1 resulting in a thorough rinse and removal of any extracted particles that may be present on the interior walls of the housing 1. This rinsing action continues as the crawler assembly moves downward providing an effective rinse of the housing 1. The crawler assembly stops the downward traverse when the maximum time allowed by the control system is reached. At this point, the spin motor 6 is turned off and the crawler drive motors 3 are reversed to return the crawler assembly to its full upward position within the housing. The fluid flow is then turned off and pressurized air is employed to purge the fluid rinse shaft 45 of solvent. A minimum of one spin rinse sequence should be performed immediately after each oil filter 20 is removed from the housing.

Thus, it should be understood that the present system includes design features to: (1) mount and secure the used oil filter during removal of wear particles, excess oil, and solvent; (2) spin the filter at high speed using centrifugal force to expel the wear particles; (3) spray the interior of the filter with solvent to assist in removal of wear particles; (4) rinse the walls of the chamber to avoid cross-contamination between samples; and (5) provide interlocks for operator safety and to prevent operator error. The above disclosure sets forth a number of embodiments of the present invention. Other arrangements or embodiments, not precisely set forth, could be practiced under the teachings of the present invention and as set forth in the following claims.

We claim:

1. An apparatus for extracting standardized samples of wear particles from a series of used filters, each filter having an opening extending from one end along an axis, said apparatus comprising:

a housing having an interior chamber for receiving said filter;

means for rotating said filter about said axis within said chamber;

means for spraying a predetermined quantity of fluid within said opening during said rotation of said filter to produce a standardized sample of said wear particles from each filter; and means for rinsing said interior of said chamber of said housing between consecutive filters to prevent cross-contamination of samples.

2. The apparatus of claim 1, wherein said filter further comprises a base and an upper end at opposing ends of said axis, and wherein said apparatus further comprises:

a housing base for contacting said filter base while allowing rotation of said filter about said axis;

a crawler for initially translating along said axis toward said housing base until said crawler contacts said upper end of said filter to thereby hold said filter between said crawler and said housing base, and allowing rotation of said filter about said axis; and a motor associated with one of said housing base and said crawler for rotating said filter about said axis.

3. The apparatus of claim 2, further comprising means for detecting contact between said crawler and said filter and for halting further translation of said crawler toward said filter.

4. The apparatus of claim 2, wherein said crawler further comprises a substantially conical, concave surface for contacting and centering said upper end of said filter about said axis.

5. The apparatus of claim 1, wherein said housing further comprises a drain to allow removal of said fluid and wear particles from said chamber.

6. The apparatus of claim 1, wherein said means for spraying of fluid comprise means to translate said spray along said axis of said filter.

7. The apparatus of claim 6, wherein said means for spraying fluid comprise:

a shaft extending along said axis having:
(a) a nozzle for directing a spray of fluid radially outward from said axis; and
(b) a central passage connected to said nozzle for delivering a flow of pressurized fluid; and a motor for translating said shaft along said axis.

8. The apparatus of claim 7, further comprising means for limiting the range of motion of said shaft depending upon the axial length of said filter opening.

9. An apparatus for extracting standardized samples of wear particles from a series of used filters, each filter having a base, an upper end, and an opening extending from said base along an axis toward said upper end, said apparatus comprising:

a housing having an interior chamber for receiving said filter;

a housing base for contacting said filter base and allowing rotation of said filter about said axis;

a crawler for initially translating along said axis toward said housing base until said crawler contacts said upper end of said filter to thereby hold said filter between said crawler and said housing base, said crawler further allowing rotation of said filter about said axis;

a motor associated with one of said housing base and said crawler for rotating said filter about said axis;

a shaft extending through said housing base for translation along said axis within said filter opening, said shaft having:
(a) a nozzle for directing a spray of fluid within said filter opening; and
(b) a central passage connected to said nozzle for delivering a flow of fluid; and control means for causing said nozzle of said shaft to spray a predetermined quantity of said fluid for each filter to produce a standardized sample, and rinse said interior chamber of said housing with said spray of fluid between consecutive filters to prevent cross-contamination of samples.

10. The apparatus of claim 9, further comprising means for detecting contact between said crawler and said upper end of said filter to halt further translation of said crawler toward said filter.

11. The apparatus of claim 9, wherein said housing further comprises a drain to allow removal of said fluid and wear particles from said chamber.

12. The apparatus of claim 9, wherein said nozzle directs said spray of fluid radially outward from said axis.

13. The apparatus of claim 9, wherein said crawler further comprises a substantially conical, concave surface for contacting and centering said upper end of said filter about said axis.

14. The apparatus of claim 9, further comprising means for limiting the range of motion of said shaft depending upon the axial length of said filter opening.

15. An apparatus for extracting standardized samples of wear particles from a series of used filters, each filter having a base, an upper end, and an opening extending from said base along an axis toward said upper end, said apparatus comprising:

a housing having:
(a) a base for contacting said filter base and allowing rotation of said filter about said axis;
(b) a movable cover defining an interior chamber in combination with said housing base for receiving said filter; and
(c) a drain associated with said housing base for draining fluid from within said chamber;

a crawler within said housing cover for initially translating along said axis toward said housing base until said crawler contacts said upper end of said filter to thereby hold said filter between said crawler and said housing base, said crawler further allowing rotation of said filter about said axis;

a motor associated with one of said housing base and said crawler for rotating said filter about said axis within said housing;

a shaft extending through said housing base for translation along said axis within said filter opening, said shaft having:
(a) a nozzle for directing a spray of fluid within said filter opening; and
(b) a central passage connected to said nozzle for delivering a flow of fluid;

means for limiting the range of motion of said shaft depending upon the axial length of said filter opening; and control means for causing said nozzle of said shaft to spray a predetermined quantity of said fluid for each filter to produce a standardized sample, and rinse said interior chamber of said housing with said spray of fluid between consecutive filters to prevent cross-contamination of samples.

16. The apparatus of claim 15, further comprising means for detecting contact between said crawler and said upper end of said filter to halt further translation of said crawler toward said filter.

17. The apparatus of claim 15, wherein said crawler further comprises a substantially conical, concave surface for contacting and centering said upper end of said filter about said axis.

* * * * *